May 17, 1960 R. I. ROTH 2,937,363

DATA PROCESSING MACHINE

Filed Dec. 28, 1955 2 Sheets-Sheet 1

INVENTOR.
ROBERT I. ROTH

BY [signature]

ATTORNEY

May 17, 1960 R. I. ROTH 2,937,363

DATA PROCESSING MACHINE

Filed Dec. 28, 1955 2 Sheets-Sheet 2

INVENTOR.
ROBERT I. ROTH

BY [signature]

ATTORNEY 2,937,363

DATA PROCESSING MACHINE

Robert I. Roth, Mount Pleasant, N.Y., assignor to International Business Machines Corporation, New York, N.Y., a corporation of New York Application December 28, 1955, Serial No. 555,810

6 Claims. (Cl. 340—173)

Figure 1A:
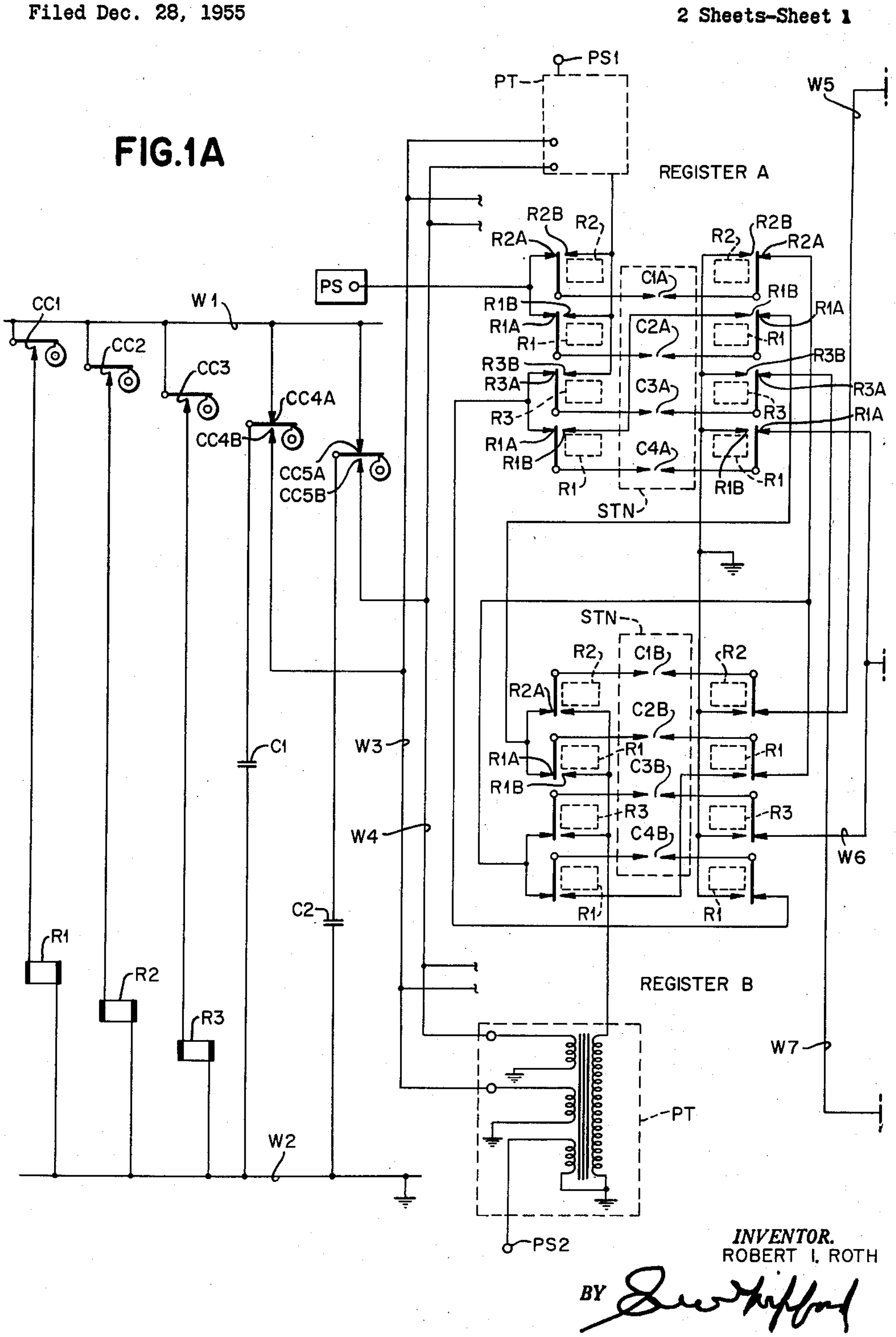

This invention relates to data processing machines in general and in particular means for comparing data for the purpose of determining the sequential relationship between two sets of data.

An object is to provide a data comparing means which is particularly suited for use in conjunction with registers or storage devices of the type based upon the principle of the coherer.

An object is to provide a means of increasing the reliability of registers and storage devices of the polystable type in which different values are represented by different stable states.

An object is to provide a register or storage device with means for positively setting the polystable stages in each of the data designating states rather than depend upon the assumption that, if the polystable designating device is not set in a significant figure-designating state, it is in a nonsignificant figure-designating state.

It is usual in registers which employ polystable data designating devices, such as triggers, to depend upon the trigger or other device remaining in its Off status to denote the fact that no significant figure such as a value-designating digit is represented by the device having been set in other than an Off stable state. The present invention contemplates positively setting the data designating stages in the Off or non-designating representative state when the data designating stage has not been set to a significant figure designating state after a period allocated to the setting of the stage in a significant figure-designating state.

Other objects of the invention will be pointed out in the following description and claims and illustrated in the accompanying drawings, which disclose, by way of example, the principle of the invention and the best mode, which has been contemplated, of applying that principle.

Figures 1B, 2:
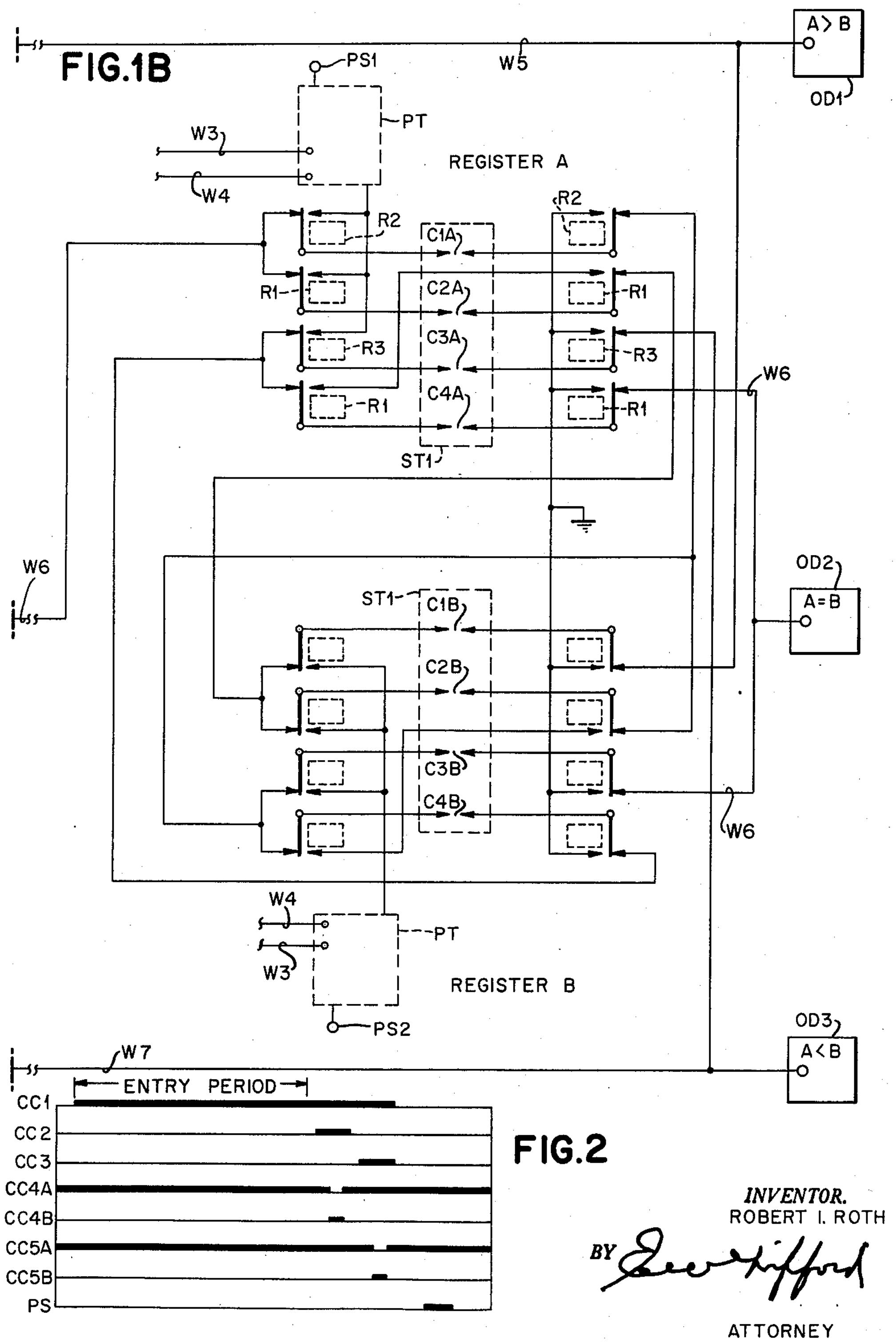

In the drawings:

Figs. 1A and 1B when placed side by side with the wires W5, W6, W7 in alignment constitute a wiring diagram.

Fig. 2 is a timing chart.

In the drawings the invention has been shown in conjunction with two registers or storage devices in which the individual stages include coherer storage elements similar to the ones disclosed in application Serial No. 400,327, filed December 24, 1953, now Patent No. 2,889,539, dated June 2, 1959, by Robert I. Roth. It will be understood, however, that other forms of polystable data designating devices or stages could be used without deviating from the basic principle of the invention.

In the above-mentioned application, digits are represented by establishing a conductive state between two electrodes which are immersed in an oil suspension of ferric particles. While the theory of operation is not completely understood, it seems to be an established principle that, when a pair of electrodes immersed in such an oil suspension is pulsed with a sufficient potential, the particles appear to weld between the electrodes and establish a low-conductivity path for electric current which will be maintained through the particles until the oil suspension is mechanically disturbed or "reset."

In the drawings there has been shown a pair of registers designated register A and register B, respectively, of which only the highest and lowest value designating stages of each are shown. These registers could be binary registers in which the stages ST1 correspond to the $2^0$ power, or lowest order stage, and the stages STN constitute the $2_n$th power stage. Only two orders have been shown, as the operability of the circuit does not depend upon the type of register or number of orders.

It is only necessary with respect to the illustrative arrangement in Figs. 1A and 1B that the register orders be arranged with the highest valued stage of the highest denominational order at the left (Fig. 1A) and the lowest valued stage in the lowest denominational order at the right (Fig. 1B) with the values and orders arranged in descending fashion from left to right. For example, if the invention were applied to a modified binary decimal register with each order of the 1-2-4-8 type, the stage STN in Fig. 1A would designate "8" in the highest order and the stage ST1 in Fig. 1B would designate "1" in the lowest order.

Each register stage comprises a coherer group, for example, ST1, comprising a suitable reservoir in which is contained the oil suspension of ferric particles in which are immersed four pairs of electrodes C1A, C2A, C3A, C4A in the case of register A and C1B, C2B, C3B, C4B in the case of register B. By suitably applying a potential of proper value across each pair of electrodes such as C1A, for example, in accordance with the principles disclosed in the aforementioned application, a low resistance path for current is established which constitutes the alternate stable state. It is contemplated that each of the coherer stages designate a value by pulsing the odd-numbered electrodes, for example, C1A, C3A, to designate the fact that no value is designated by the coherer unit and to pulse the even-valued electrodes C2A, C4A, for example, to designate a value which in the case of Fig. 1B, assuming a binary register, would represent the bit value "1."

According to the principle of the invention, there is provided an entry period in which the even-valued electrodes will be pulsed to designate a value and if the even-numbered stages have not been pulsed by the end of this period, means is provided to pulse the odd-numbered electrodes C1A, C3A, for example, to positively denote the fact that the coherer unit does not designate a significant value but designates zero. In accordance with this principle the proper electrodes in the respective coherer stages ST1, STN will always be positively pulsed to either represent a value or zero. With this arrangement it is always necessary to set up a positive comparing circuit with each comparing cycle and failure to set up a definite comparing circuit indicates that an error was committed in the entry of values in the register. As will be seen later, the invention contemplates the provision of dual comparing circuits through the comparing units one of which must always be established in order to positively select an output device which represents the sequential relation between the sets of data stored by the respective registers.

The wiring of the coherer units ST1, STN is identical and each includes a pulse transformer PT, the primary of which has three separate input windings (Fig. 1A) one of which is connected to a plug socket PS1 in the case of register A and PS2 in the case of register B. These plug sockets will be connected by plugwires to suitable digit-entering pulse sources for effecting value entries in the respective registers.

Associated with each of the coherer units ST1, STN is a group of relays designated R1, R2, R3, which are controlled by the timing contacts CC1, CC2, CC3, which cause the relays R1, R2, R3 to be energized as indicated in Fig. 2. During the time designated with the caption "Entry period" in Fig. 2 the relays R1 will be energized through the contacts CC1 and the plug sockets PS1, PS2 will be selectively impulsed for the purpose of setting the register to designate values.

In order to illustrate the manner in which the stages ST1, STN are set to represent values, reference may be had to the stage STN of register B for which the internal wiring of the pulse transformer PT is shown at the bottom of Fig. 1A. A pulse applied to the value entry primary winding through the plug socket PS2 will induce an entry pulse in the secondary of transformer PT. This pulse first will pass through the contacts R1B to the coherer electrodes C2B, and contacts R1B; then through the contacts R1B and coherer electrodes C4B to ground to render coherer electrodes C2B, C4B conductive. This conditions stage STN of register B to represent the particular value allocated thereto which in a pure binary register, as explained above, could be the bit value $2^n$ or "8" in a modified binary decimal register.

It will be evident in Fig. 1A that the circuit arrangement is such that the pulsed coherers C2B, C4B will be in parallel with both unenergized coherers C1B, C3B through contacts R1B, since relay R1 is still energized at the times when relays R2, R3 are energized by contacts CC1, CC2 (Fig. 2) to permit activating the coherers C1B, C3B, one after the other. This prevents setting either of coherers C1B, C3B to represent zero when coherers C2B, C4B have been set due to the low resistance shunting effect of the set coherers C2B, C4B. On the other hand, it is also plain that if coherers C2B, C4B had not been set, only one coherer C1B, C3B at a time will be placed in parallel with C2B, C4B in series to provide a lower resistance path enabling C1B, C3B to be set but not C2B, C4B.

Let it now be assumed that stage STN of register A is not to be set to designate a value and plug socket PS1 will not be pulsed during the entry period. At the end of this period contacts CC2 close (Fig. 2) and energize relay R2. Also the contacts CC4A open and contacts CC4B close. During the period in which contacts CC4A were closed the condenser C1 will be connected across line wires W1, W2 and receive a full charge. While contacts CC2 are closed energizing relay R2, contacts CC4B close and allow the condenser C1 to discharge over the wire W3 and the second primary windings of all of the pulse transformers PT. In the case of stage STN of register A, this pulse will pass through the contacts R2B and coherer electrodes C1A to render the coherer unit conductive. Similar action takes place when contacts CC3 and CC5B close later in the cycle causing the condenser C2 to discharge and coherer electrodes C3A to be set. Thus, by the end of the cycle, stage STN of register A will have been set through the odd-numbered electrodes C1A, C3A to represent "0" and the corresponding stage of register B will be set to represent a valve, say $2^n$, by means of the even-numbered electrodes C2B, C4B. Since register B in this case is highest in the highest order or stage, the number stored in register B is highest in value in relation to register A and a circuit will be closed to indicate this fact.

For the purpose of testing the status of the registers after the entries have been completed, there is provided a suitable comparing pulse source PS (Fig. 1A) which emits a timed pulse as indicated diagrammatically in Fig. 2. This pulse will pass through the contacts R2A and the coherer electrodes C1A of register A and contacts R1A and coherer electrodes C4B of register B, thence through contacts R3A and coherer electrodes C3A of register A to the wire W7 which leads to the output device OD3 (Fig. 1B) designating the fact that register A is less in sequential value than register B.

Now let it be assumed that both stages STN in Fig. 1A have been set to designate a value. In this case all of the even-numbered coherer electrodes will have been made conductive and the comparing pulse from source PS will travel through contacts R1A and coherer electrodes C2A of register A; contacts R1A and coherer electrodes C2B of register B; contacts R1A and coherer electrodes C4B, back to contacts R1A and coherer electrodes C4A to the equal wire W6 and the pulse will enter the relay and coherer electrode network of the next lower order at the same point as in the highest order to test the next lowest order.

On the other hand, let it be assumed that there is no significant value represented in the highest order. In this case the odd-valued coherer electrodes C1A, C3A, C1B, C3B will have been made conductive. This time the pulse will pass through contacts R2A (Fig. 1A) coherer electrodes C1A, contacts R3A, coherer electrodes C3B to the equal wire W6, and again will be applied to the next lowest order or stages to determine the sequential relation of the data in the lower orders or stages of the registers.

If register A had been set to designate a value and register B set to designate "0," the conditions first described will be reversed and, in effect, the circuit tracing will be reversed. In this case the pulse enters contacts R1A and passes through coherer electrodes C2A to contacts R2A and coherer electrodes C1B, to the wire W5 leading to output device OD1 which signifies that register A has the higher value.

When the registers designate identical values, the equal condition described above will be repeated in all orders and the comparing pulse will pass over the wires W6 to the output device OD2 which signifies that the registers are equal.

The output devices OD1, OD2, OD3 may consist of any suitable means for controlling auxiliary equipment in accordance with the numerical relations between registers. For example, they could consist of triggers set in On status to represent the numeric relation or suitable gates which control other circuits.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine, a register comprising a series of paired coherer devices, each pair representing zero and a component of a value to be entered in the register, each coherer device being normally nonconductive and becoming current conductive when pulsed, and selective pulsing means operative to first pulse certain of said devices in different pairs selectively to represent the different components of a particular value to be entered in said register and, after all selective pulsing has been completed, to pulse the alternate device of each pair in which no device has been pulsed to represent a component of value, said pulsing means including circuit means for placing the zero representing devices in parallel with the corresponding value representing device for zero pulsing purposes, said pulses being ineffective to make the zero representing devices conductive when the value representing devices corresponding thereto have previously been made conductive to thereby shunt the corresponding zero representing devices.

2. In a data processing machine, a series of $n$ pairs of coherer devices, each pair corresponding to one of the powers of 2 in a binary series to the $2^{nth}$ power, one coherer of a pair being made conductive to represent one of the component values in such series and the other being made conductive to indicate the absence of said one component in a value to be entered in the register, means to selectively make conductive the value designating devices according to the presence of the different component values in such value to be entered, and means separate from the first named means for making conductive the zero designating devices in all of the pairs in which the value designating device has not been made conductive, said last named means including circuit means for connecting said zero representing devices in parallel with the corresponding value representing devices for making the zero representing devices conductive, said value representing devices, when made conductive, preventing the corresponding zero representing devices from being made conductive.

3. In a data processing machine, a register having both settable value designating elements and an equal number of associated settable zero designating elements, means operative to selectively set the value designating elements according to components of a value to be entered in said register, and separate means common to the zero designating elements to set those zero designating elements whose corresponding value designating element remains unset after the value setting operation, said setting means including circuit means for connecting said value designating elements in series-shunt circuits with said zero designating elements to prevent setting those zero designating elements corresponding to previously set value designating elements.

4. In a data processing machine, a register having a series of normally relatively high resistance elements capable of responding to electrical pulses to close low resistance circuits to represent components of values; a second series of high resistance elements, each corresponding to one of the first elements and also capable of responding to electrical pulses to close low resistance circuits representing zero; and means for pulsing first the value representing elements to represent components of value nad thereafter pulsing the zero representing circuits to represent zero, including circuit means operative to place the zero representing circuits in shunt with corresponding value representing elements for pulsing both, said zero representing elements when so pulsed being selectivity shunted by any pulsed value representing elements to prevent setting the corresponding zero representing elements due to the low resistance path initially closed by the value representing elements, and responding to pulses to close the low resistance paths representing zero only when the corresponding value representing elements have not previously been pulsed.

5. In a data processing machine, a register comprising a series of value representing coherer devices each capable of responding to a current pulse to establish a low resistance path representing a component value; a corresponding series of zero representing coherer elements, each paired with one of the first elements; and means for first selectively pulsing certain of the value representing elements to establish said paths to represent the components of a value and thereafter pulsing both the value representing and zero representing elements in parallel to establish paths representing zero by those zero representing coherer elements not pulsed to represent a value, the low resistance paths for the pulsed value representing elements preventing the pulses applied to the corresponding zero representing elements from becoming effecitve by shunting said zero elements.

6. In a data processing machine, a register comprising two series of pairs of data representing elements, one pair in each series representing a component value and corresponding to a pair in the other series which represents zero, each element when pulsed electrically changing from a relatively high resistance path to a low resistance path; and means for pulsing said elements electrically, including circuit means for initially connecting each pair of value designating elements in series for selective pulsing to represent the component values of a number and thereafter connecting each pair of value representing elements in series parallel with the corresponding zero representing elements whereby the latter elements will be effectively pulsed to represent zero only if the corresponding pairs of value representing elements have not been pulsed to establish low resistance paths shunting said zero representing elements.

References Cited in the file of this patent

UNITED STATES PATENTS

| | | |
|---|---|---|
| 2,512,038 | Potts | June 20, 1950 |
| 2,580,768 | Hamilton et al. | Jan. 1, 1952 |
| 2,607,006 | Hoeppner | Aug. 12, 1952 |
| 2,726,038 | Ergen | Dec. 6, 1955 |